Nov. 27, 1945. C. SEQUIN 2,389,876
APPARATUS FOR MAKING BLADES FOR TURBO-MACHINES
Filed June 2, 1944
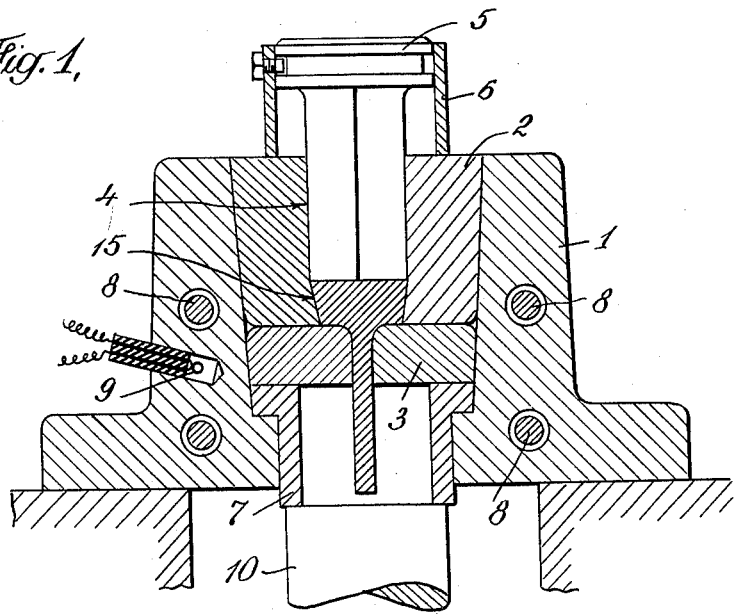
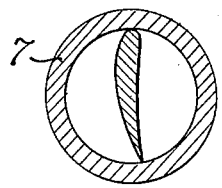
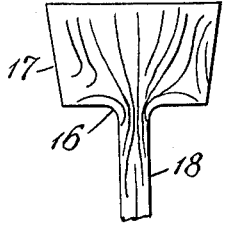
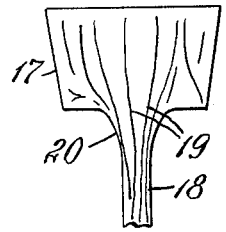
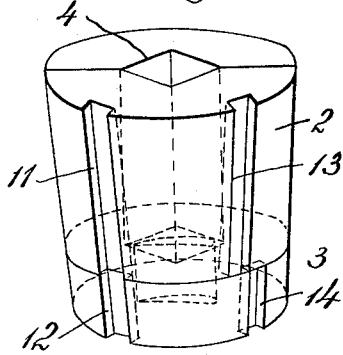
INVENTOR
CARL SEQUIN
BY
ATTORNEYS Patented Nov. 27, 1945

2,389,876

UNITED STATES PATENT OFFICE 2,389,876

APPARATUS FOR MAKING BLADES FOR TURBOMACHINES

Carl Sequin, Oberwinterthur, Switzerland

Application June 2, 1944, Serial No. 538,428

2 Claims. (Cl. 207—17)

The invention relates to an apparatus for the extrusion of metal in forming blades for turbo machines from light metal by pressing a roughly shaped piece in a matrix consisting of a part corresponding to the foot of the blade and a part for extruding the blade.

The invention provides apparatus comprising a mold body having an interior opening circular in cross section for receiving a matrix that is circular in cross section and rotatable in the opening, means for limiting the insertion of the matrix into the opening, said matrix comprising at least four parts, two of said parts providing a space for forming the blade root and two of said parts providing a space for forming the blade, said two parts for forming the blade root and said two parts for forming the blade being rotatably adjustable with respect to each other, whereby the angle of setting of the blade with respect to the blade root can be varied, and means for fixing the said parts in position.

The invention also provides curved walls in the space for the blade which are of such shape as to be adapted to the lines of flow of the metal.

The invention is described in more detail below with the aid of the drawing.

Fig. 1 shows a longitudinal section through a pressing tool for the manufacture of blades according to the method proposed in the invention.

Fig. 2 shows a cross-section through the straight guiding means for the blade.

Fig. 3 is a diagrammatic representation of the root and blade matrices of the tool shown in Fig. 1.

Figs. 4 and 5 shows cross-sections through two different blades manufactured according to the method proposed in the invention.

The body 1 of the mould shown in Fig. 1 has a tapered bore into which the root matrix 2 and the blade matrix 3 are inserted. Both matrices are designed in two parts in order that the halves of the matrices can be easily removed from the pressed piece after they have been taken out of the mould body. The upper part of the root matrix also forms the guide way 4 for the stamp 5. Attached to the stamp is a spacer 6 from which the position of the stamp and thus the stage of the pressing process can be seen. In the bore of the body of the mould, a straight guiding means in the form of a pipe 7 is also placed.

In order to enable the pressing tool to be kept at the correct temperature, the bars 8 pass through bores in the body of the mould, and these bars can be electrically heated. The temperature of the pressing tool can be registered by means of a thermo-element 9. For removing the pressed piece and the matrices from the mould body, a stamp 10 is provided with the aid of which the pressed piece and the matrices can be forced upwards out of the tapered bore.

The root matrix 2 (Fig. 3) and the blade matrix 3 have key grooves 11, 12 and 13, 14. According as the grooves 11 and 12 or the grooves 13 and 14 are held in a straight line by a key of the mould body, the angle of setting of the blade being pressed can be made greater or smaller.

For the manufacture of the blades, the straight guiding member 7 is first introduced into the body of the mould, then the blade matrix 3 and finally the root matrix 2. A rough piece of a metal suitable for pressing is introduced into the guide way of the stamp. The rough metal and the pressing tool are heated to the required temperature before pressing. After the stamp 5 has been brought into its guide way, the pressing process can begin with the aid of a press not shown in the drawing.

First of all the blade root is formed in the part 15 of the root matrix. At the same time part of the rough material is pressed out through the narrow matrix 3 and the blade itself is formed as a continuation of the root. Any bending of the blade piece, which would be favoured by the eccentric position of the centre of gravity of the surface of the blade section, is prevented by the straight guiding piece 7. When the spacer 6 comes in contact with the matrix 2, the root of the blade is in its final form and the blade itself has attained the correct length.

The pressed piece together with the matrices can then be forced upwards out of the body of the mould by the stamp 10. The two halves of the matrices can be taken away from the sides of the stamp and the pressed piece.

In order to ensure that the transition at the point 16 (Fig. 4) between the root 17 and the blade 18 is as good as possible, the curve 20 (Fig. 5) should be adapted to the lines of flow 19 of the material being pressed. This curve is provided in a suitable manner on the blade matrix, so that there can be no choking at the transition from the root to the blade when the metal is pressed.

If the straight guiding means in the form of a pipe should prove insufficient, it is also possible to arrange ribs which guide the blade at other places.

If it is desired that the blade should have a twisted form, a correspondingly twisted mould can be inserted in the guide piece and this will ensure that the blade is twisted as it is pressed. In order to provide a choice of several angles of setting for the blades, it would be necessary for more key grooves to be provided in the root matrix and the blade matrix.

I claim:

1. Apparatus for the extrusion of metal in forming blades for turbo-machines which comprises a mold body having an interior opening circular in cross section for receiving a matrix that is circular in cross section and rotatable in the opening, means for limiting the insertion of the matrix into the opening, said matrix comprising at least four parts, two of said parts providing a space for forming the blade root and two of said parts providing a space for forming the blade, said two parts for forming the blade root and said two parts for forming the blade being rotatably adjustable with respect to each other, whereby the angle of setting of the blade with respect to the blade root can be varied, and means for fixing the said parts in position.

2. Apparatus according to claim 1 which comprises curved side walls in the space for the blade which are of such shape as to be adapted to the lines of flow of the metal.

CARL SEQUIN.